May 17, 1949.  E. Y. SEBORG  2,470,415
DRIVE MECHANISM

Filed March 18, 1947  4 Sheets-Sheet 1

INVENTOR
Earnest Y. Seborg

May 17, 1949.  E. Y. SEBORG  2,470,415
DRIVE MECHANISM
Filed March 18, 1947  4 Sheets-Sheet 3
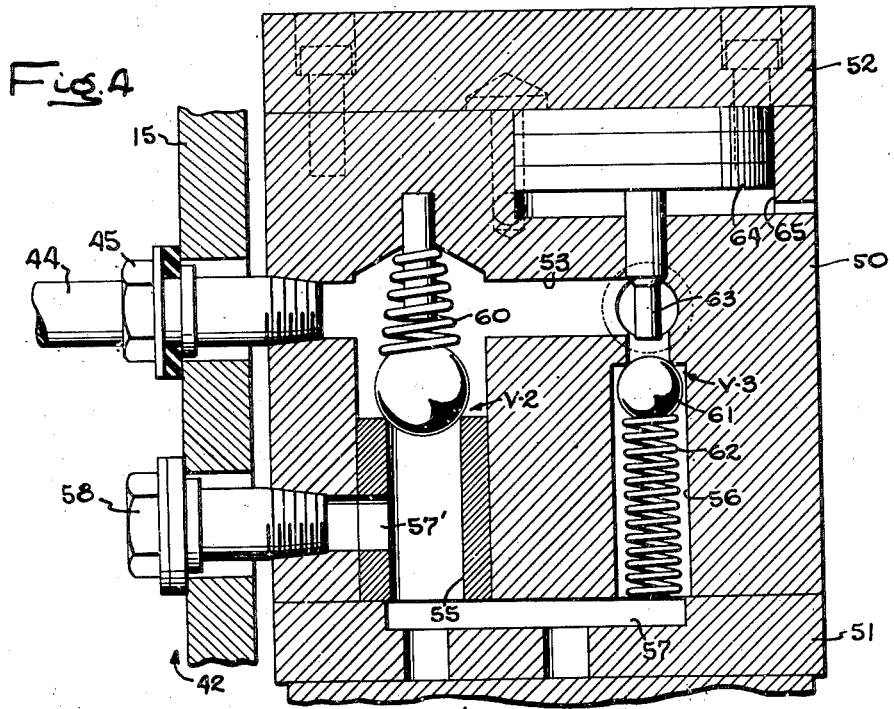
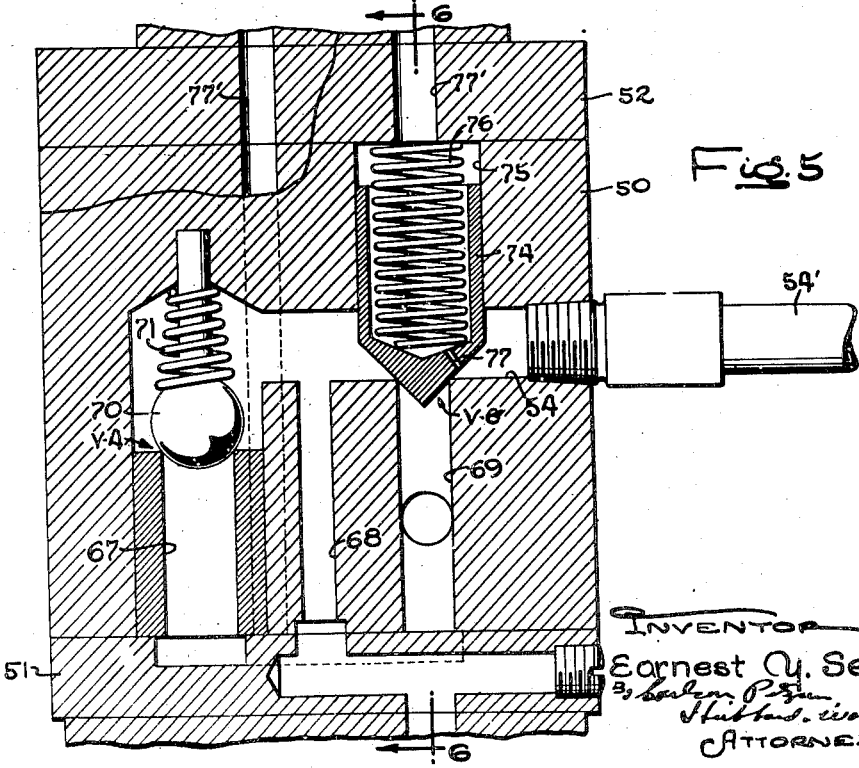
INVENTOR
Earnest Y. Seborg
ATTORNEY INVENTOR
Earnest Y. Seborg Patented May 17, 1949

2,470,415

UNITED STATES PATENT OFFICE 2,470,415

DRIVE MECHANISM

Earnest Y. Seborg, Rockford, Ill., assignor to Barnes Drill Co., Rockford, Ill., a corporation of Illinois Application March 18, 1947, Serial No. 735,406

12 Claims. (Cl. 60—97)

The invention relates to drive mechanisms of the type employed in operating the tool or work supports of machine tools to produce relative approach, feed and return movements of the tool and work, and it is more particularly concerned with fluid operated drive mechanisms.

One object of the invention is to provide a drive mechanism for machine tools which has the efficiency, flexibility, ease of control and other desirable characteristics of conventional hydraulic drives but which is much simpler in construction, more compact and less expensive to manufacture.

Another object is to provide a fluid operated drive mechanism which utilizes simpler, less expensive valves, less piping and a smaller hydraulic pump than conventional hydraulic drives of comparable power and adaptability.

A more specific object is to provide drive mechanism for machine tools in which the rapid approach and retracting movements of the tool and work are produced by a pneumatically operated actuator while the slower feeding movements are produced by a hydraulically operated actuator and in which the actuators are rendered operative automatically at the proper points in the machine cycle.

It is also an object of the invention to provide a fluid operated drive mechanism in which the valves and associated control elements are assembled in a simple compact unit adapted to be mounted upon or closely adjacent the actuators whereby piping is reduced to a minimum.

Other objects and advantages of the invention will become apparent from the following detailed description of the preferred embodiment illustrated in the accompanying drawings, in which.

Figure 3:
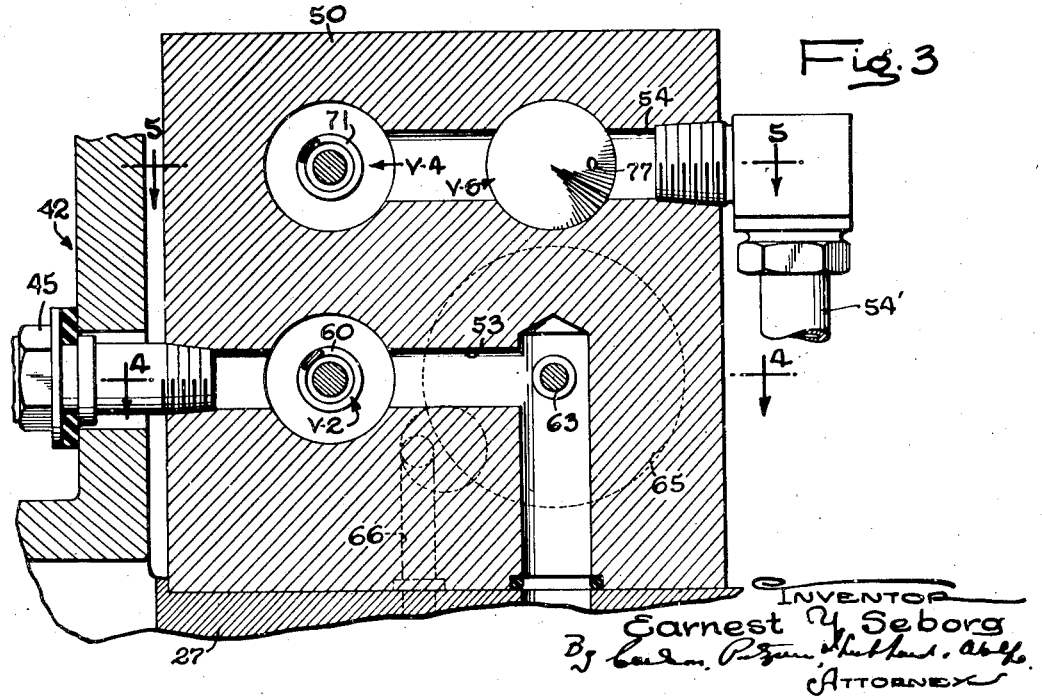
Fig. 3 is a sectional view taken in a vertical plane substantially on the line 3—3 of Fig. 2.

Figs. 4 and 5 are sectional views taken in horizontal planes respectively on the lines 4—4 and 5—5 of Fig. 3.

Figure 6:
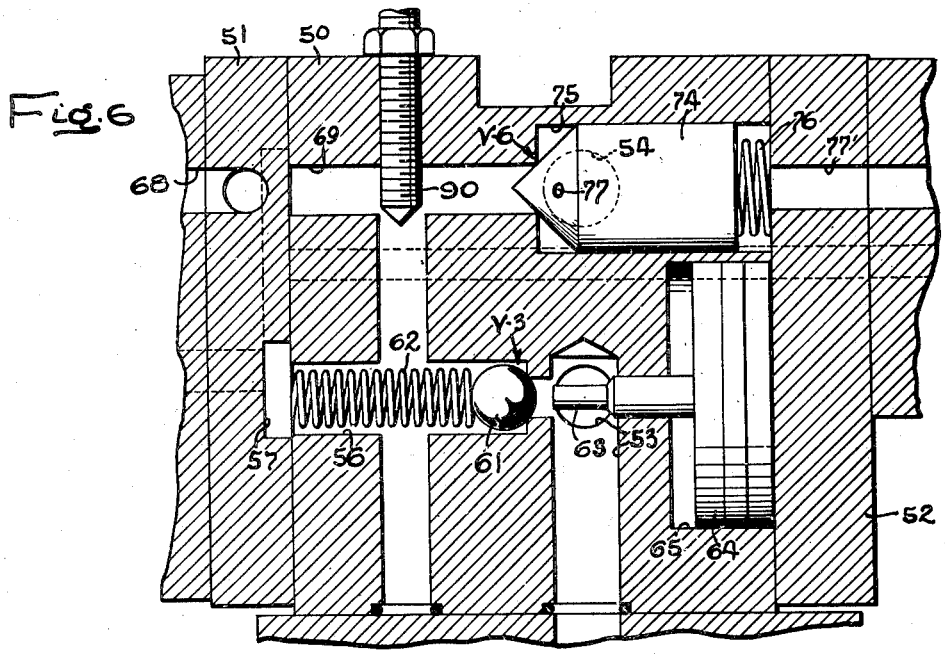

Fig. 6 is a sectional view taken in a vertical plane substantially on the line 6—6 of Fig. 5.

Figure 7:
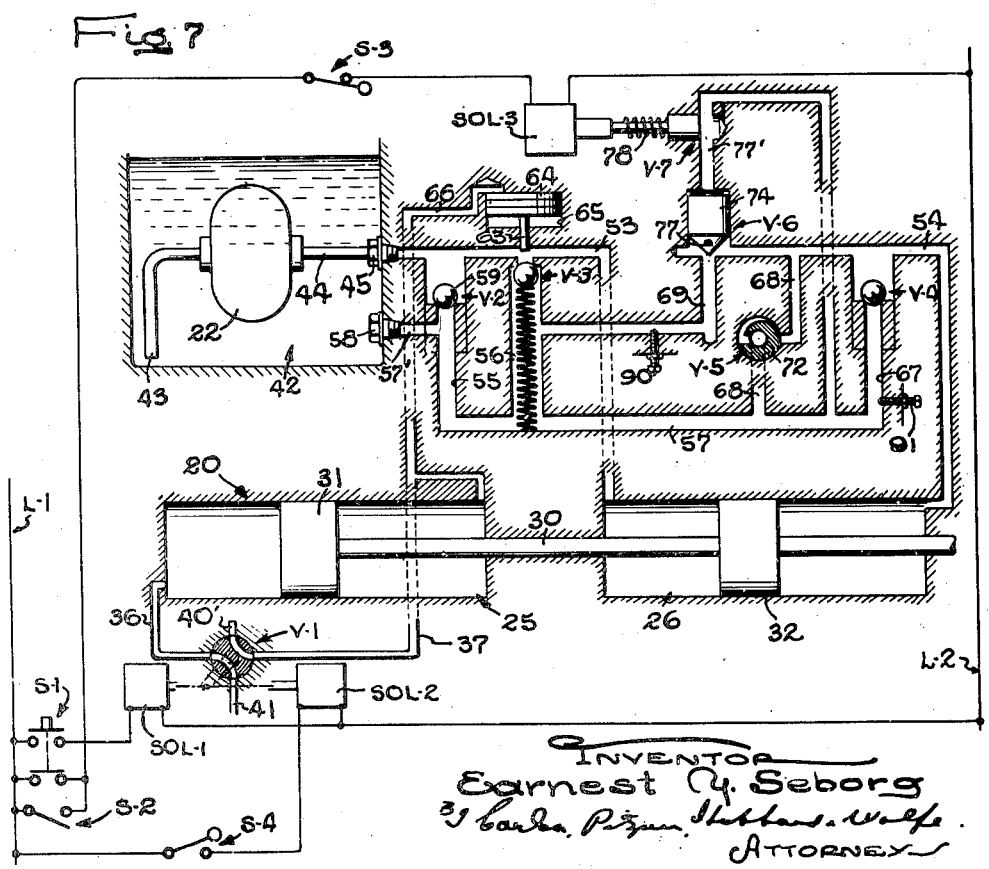

Fig. 7 is a diagrammatic view of the electrical, pneumatic and hydraulic circuits of the drive mechanism.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

For purposes of illustration, the invention has been shown as incorporated in a self-contained machine tool unit which may be mounted on a machine bed 10 with other similar units and other machine elements including a work support to form a complete machine tool. The particular unit shown comprises an elongated hollow base 11 having spaced parallel ways 12 at one end supporting a reciprocal head or carriage 13. While the carriage 13 may be arranged for supporting a workpiece if desired, it is shown here as equipped with a rotatable spindle 14 adapted to carry a tool for operating on a workpiece carried by a suitable work support (not shown) mounted on the machine bed 10 adjacent the end of the ways 12. The spindle 14 is rotatably driven by an electric motor M supported on the base 11. The motor in this instance is mounted on an upright box-like frame 15 integral with and extending upwardly from the base 11 at the rear of the ways 12.

Figure 1:
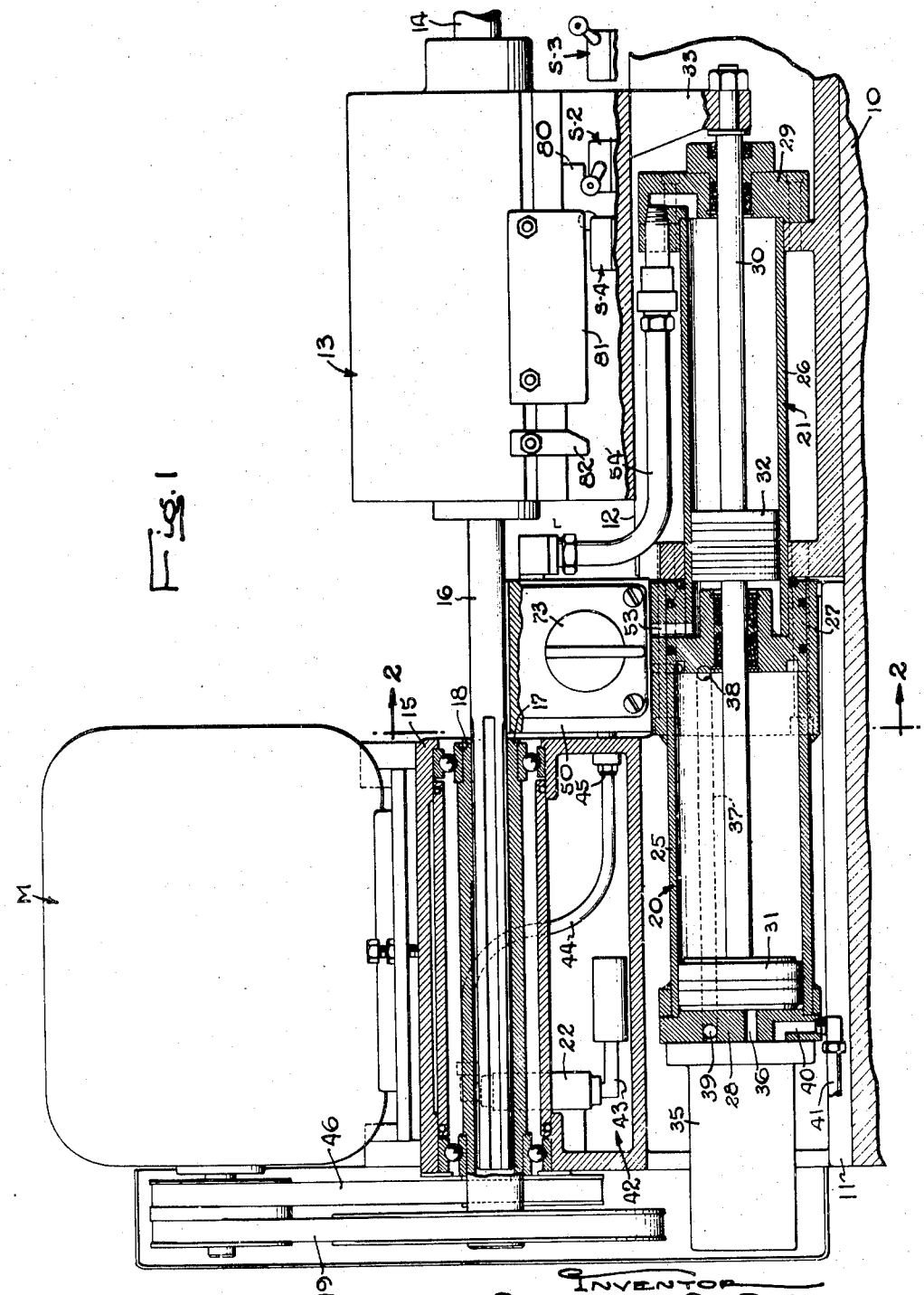
Figure 1 is a longitudinal sectional view of a machine tool equipped with drive mechanism embodying the features of the invention.

The driving connection between the spindle 14 and the motor M comprises an externally splined shaft 16 telescoping into an internally splined sleeve 17 rotatably supported in the frame 15 by antifriction bearings 18. As shown in Fig. 1, the sleeve 17 is driven by the motor M through the medium of a V-belt 19. The spline connection between the sleeve and the shaft serves to maintain the driving connection with the motor while the carriage 13 is reciprocated on its ways.

The present invention is concerned primarily with driving mechanism for imparting forward and return movements to a reciprocable machine element, in this instance the carriage 13. Movements of the carriage when the tool and work are not in operative association, such as approach and withdrawal movements, are desirably effected at a rapid rate and require relatively little power. Movements of the carriage when the tool and work are in operative relation, commonly referred to as feeding movements, are at a substantially slower rate and must be uniform and accurately controlled. Moreover, in some machining operations as, for example, drilling, considerable power is required to feed the tool into the work.

In accordance with the invention, one actuator 20 is provided for imparting the approach and withdrawal movements to the carriage 13 and a separate actuator 21 is provided for imparting the feeding movements thereto. The latter actuator is preferably of the hydraulically operated type, while the actuator 20 may be pneumatically operated. As the hydraulic actuator is required only to effect the feeding movements of the carriage, it may be served by a pressure fluid pump 22 of relatively small capacity with a corresponding reduction in initial cost and a substantial saving in operating costs. It will be appreciated that pneumatically operated actuators are simpler and less expensive to build than hydraulic actuators and that they may be operated from the compressed air lines usually available in shops, thus making it unnecessary to equip the machine with a pump or compressor for serving the actuator.

Referring now to Fig. 1 of the drawings, the actuators 20 and 21 of the exemplary machine are of the cylinder and piston type and are constructed as a single compact unit. Thus, a pair of cylinders 25 and 26 are assembled in end to end relation on opposite sides of a common cylinder head 27 which closes the adjacent ends of the cylinders. The outer ends of the cylinders are closed by heads 28 and 29. One or more of the cylinder heads may be suitably shaped for attachment to the base 11 whereby the actuators are rigidly secured in place in the machine tool unit.

Extending axially through the cylinders 25 and 26 and through the heads 27 and 29 is a piston rod 30 having a piston 31 working in the cylinder 25 and a second piston 32 working in the cylinder 26. Suitable packing is provided in the cylinder heads for preventing leakage of air or fluid around the piston rod. At its outer projecting end the piston rod 30 is anchored to a depending bracket 33 rigid with the carriage 13 to provide an operative connection between the actuators and the carriage.

The air supply for the pneumatic actuator 20 is controlled by a simple two position valve V—1 (Fig. 7) operative to direct compressed air to either end of the pneumatic actuator cylinder 25 while venting the other end to the atmosphere. The valve V—1 is herein shown as of the rotary type arranged to be operated to either position selectively by a pair of solenoids SOL—1 and SOL—2. The valve and solenoids may be enclosed in a metal cap or housing 35 mounted on a suitable pad formed on the outer face of the cylinder head 28 as shown in Fig. 1. A bore 36 in the cylinder head connects the valve V—1 with the rear end of the pneumatic actuator cylinder 25 while connection with the front end of the cylinder is provided by a conduit or pipe 37 extending between ports 38 and 39 formed in the cylinder heads 27 and 28. The latter cylinder head is also formed with an inlet bore 40 opening at one side of the head for connection with a pipe 41 leading to the shop compressed air line or other source of air under pressure. An outlet opening 40' (Fig. 7) is provided for venting the valve to the atmosphere.

As indicated heretofore, pressure fluid for operating the hydraulic actuator 21 is supplied by the pump 22. The pump may be of any suitable type and as herein shown is mounted on the frame 15 preferably with its lower end projecting into a fluid reservoir 42 formed within the frame. The pump is arranged to draw fluid from the reservoir through an intake or suction pipe 43 and to discharge the fluid under pressure through a conduit 44 which, in this instance, extends to a fitting 45 in the front wall of the reservoir by which a connection is made with the control system for the actuator 21, as will appear presently. In the exemplary machine the pump 22 is driven directly from the motor M through the medium of a V-belt 46.

The hydraulic system for the actuator 21 includes suitable valves and fluid passages for regulating the flow of pressure fluid to and from the ends of the cylinder 26 and for coordinating the operations of the hydraulic and pneumatic actuators. To this end means is provided in the system for establishing communication between opposite ends of the cylinder 26 to permit substantially unobstructed transfer of fluid therebetween while the carriage is being traversed by the pneumatic actuator 20. Means is also provided for interrupting such communication to render the hydraulic actuator operative to drive the carriage at a feeding rate through a predetermined portion of the machine cycle and for initiating the return of the carriage by the pneumatic actuator without interference from the hydraulic actuator.

The simple character and functional relationship of the valves required in the improved hydraulic control system permits the valves to be incorporated in a single compact unit adapted to be closely coupled with the actuator whereby external piping is reduced to a minimum. As shown in Figs. 2–6, the valve unit comprises a generally rectangular body or manifold 50 in the form of a metal block with flat metal plates 51 and 52 bolted or otherwise removably secured to opposite sides. The block 50 and associated plates 51 and 52 are formed with suitable bores and channels for the accommodation of the valves and to provide passages for interconnecting the various elements of the hydraulic system.

Figure 2:
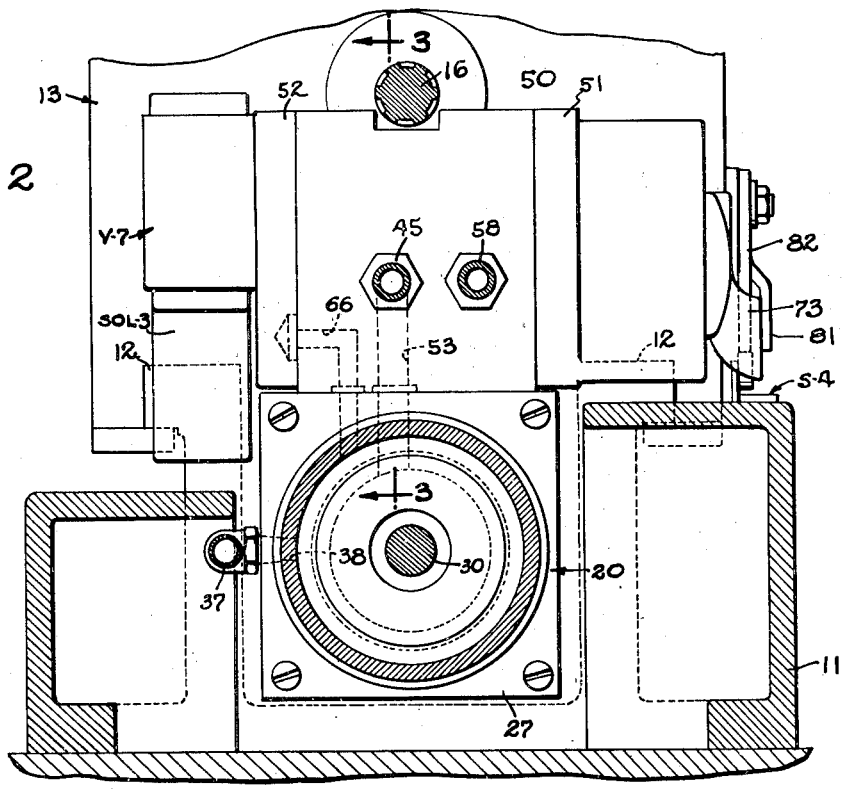
Fig. 2 is a sectional view taken in a vertical plane substantially on the line 2—2 of Fig. 1.

Referring now to Fig. 7 of the drawings, it will be observed that passages 53 and 54 communicate respectively with opposite ends of the cylinder 26. The passage 53 is formed entirely by bores and channels within the valve body 50 and cylinder head 27, as shown in Figs. 1, 2 and 3. Passages 55 and 56 in the valve body connect the passage 53 with a drain passage 57 in communication with the reservoir 42 through a branch passage 57' and a fitting 58 in the side wall of the reservoir. A check valve V—2 comprising a ball 59 (Fig. 4) yieldably held by a spring 60 against a seat formed in the passage 55 prevents flow of pressure fluid from the passage 53 to the drain.

A valve V—3 comprising a ball 61 held by a spring 62 against a seat formed in the passage 56 normally prevents flow of fluid through the passage in either direction. The spring 62 is tensioned to permit the valve to open when a predetermined fluid pressure is developed in the passage 53 thus diverting excess fluid to the drain. The valve member or ball 61 is also adapted to be shifted to an open position by an actuator comprising a rod 63 having a piston enlargement 64 working in a cylinder 65 formed in the block 50. The cylinder 65 is connected by a passage 66 formed in part in the block 50 and in part in the cylinder head 27 with the forward end of the pneumatic cylinder 25. The arrangement is such that the valve V—3 is opened when air under pressure is admitted to the forward end of the pneumatic cylinder 25.

The passage 54 leading to the forward end of the cylinder 26 is formed in part by bores and channels within the valve block 50 (Fig. 3) and the cylinder head 29 and in part by a tube or conduit 54' (Fig. 1) extending therebetween. Within the valve body the passage 54 is connected with the drain conduit by three passages 67, 68 and 69. The passage 67 is fitted with a check valve V—4 comprising a ball 70 (Fig. 5) normally held in a seated or closed position by a spring 71 so as to prevent flow of fluid from the passage 54 to the drain.

Flow of fluid through the passage 68 is controlled by an adjustable metering valve V—5 having a rotatable member 72 disposed within a recess in the plate 51. A rotatable adjusting member or knob 73 (Figs. 1 and 2) is provided on the control unit for manual adjustment of the metering valve.

Interposed in the passage 69 is a remote control check valve V—6 which may be of any preferred type. As herein shown the valve V—6 comprises a plunger 74 (Figs. 5, 6 and 7) working in a cylinder 75 formed in the block 50 and having one end portion positioned to control flow of fluid through the passage 69. The plunger 74 is normally urged to a closed position by a spring 76 whose action is supplemented by fluid under pressure supplied to the cylinder 75 at the rear of the plunger through a bleed passage 77. A vent passage 77' opening from the cylinder 75 at the rear of the plunger is controlled by a valve V—7, the arrangement being such that the plunger 74 is moved to and retained in closed position when the valve V—7 is closed. When the valve V—7 is opened the plunger 74 is movable to an open position by the pressure of the fluid in the passage 54, thus opening the passage 69 for diverting fluid flow to the drain 57. As herein shown, the valve V—7 is biased to a closed position by a spring 78 (Fig. 7) and is operated to open position by a solenoid SOL—3 (Figs. 2 and 7).

The pneumatic and hydraulic controls above described are interconnected by electrical controls which serve to coordinate their operation and effect the automatic cycling of the machine. In the exemplary machine the electrical controls include a normally open starting switch S—1 in circuit with the solenoids SOL—1 and SOL—3 adapted to be closed manually to initiate a machine cycle. Operation of the machine is continued by a running switch S—2 connected in shunt relation to the starting switch. The switch S—2 is actuated by a dog 80 (Fig. 1) movable with the carriage 13, the switch being open when the carriage is fully retracted and closed upon its movement from the retracted position.

The change from a rapid approach movement to a feeding movement of the carriage is controlled by a normally closed switch S—3 connected in circuit with the solenoid SOL—3. Switch S—3 is operated to open position by a dog 81 (Fig. 1) mounted on and movable with the carriage 13. In the particular embodiment illustrated, the dog is formed with an elongated cam surface adapted to hold the switch S—3 closed throughout the feeding movement of the carriage. When an interrupted or "jump feed" is required, the cam surface may be appropriately recessed to permit the switch to close and reinitiate rapid forward movement of the carriage at one or more points in its travel. Rapid return of the carriage is initiated by a normally open switch S—4 connected in circuit with the solenoid SOL—2 and adapted to be closed by a dog 82 mounted on and movable with the carriage.

With the motor M running and the pipe 41 connected to a suitable source of compressed air, a machine cycle is started by momentary actuation of the starting switch S—1. This switch connects the solenoid SOL—1 across conductors L—1 and L—2 of the power line to energize the solenoid which shifts the valve V—1 to the forward position shown in Fig. 7. Compressed air is directed by the valve through the passage 36 to the rear end of the pneumatic cylinder 25 thereby shifting the piston 31 forwardly and with it the carriage 13.

The closure of the starting switch S—1 also completes the circuit by way of the normally closed feed switch S—3 for energizing the solenoid SOL—3. This circuit is maintained closed by the running switch S—2 upon movement of the carriage from retracted position. Accordingly, the starting switch may be released without interrupting the machine cycle.

Solenoid SOL—3 upon energizing opens the vent valve V—7 which permits control valve V—6 to open and establish communication between opposite ends of the cylinder 26 for the transfer of fluid therebetween. As the carriage is advanced by the pneumatic actuator 20 the fluid in front of the hydraulic actuator piston 32 is forced out of the hydraulic cylinder 26 through the passage 54, valve V—6, passages 69, 56, 57 and 55. Due to the suction created in back of the piston 32 by its advance, the fluid is drawn through check valve V—2 where it joins the discharge from the pump 22 to fill the rear end of the hydraulic cylinder 26 by way of the passage 53. An adjustable restricting member 90, such as a screw, may be provided on the passage 69 for regulating the flow therethrough and thereby the rate of advance of the carriage.

By reason of this novel fluid circuit arrangement, an ample fluid supply for maintaining the cylinder 26 filled is insured even though the capacity of the pump 22 is substantially smaller than is necessary for that purpose. As the valve V—6 is open, a minimum of resistance is offered to the transfer of the fluid between the ends of cylinder 26 and the advance of the carriage may proceed at a relatively rapid rate. Any excess fluid in the circuit is returned to the reservoir 42 by way of the connection through the fitting 58.

Rapid forward movement of the carriage 13 continues until the dog 81 engages and actuates the feed switch S—3 to open the circuit of the solenoid SOL—3. The solenoid upon deenergizing closes the vent valve V—7 which in turn brings about the closure of the control valve V—6. Fluid from the forward end of the hydraulic cylinder 26 is now diverted through the passage 68 and the rate of flow is determined by the setting of the volume control valve V—5. Fluid under pressure is supplied to the rear end of the cylinder 26 from the pump 22 by way of the passage 53 thus furnishing the power for advancing the carriage in its feeding movement. In the particular machine illustrated compressed air is supplied to the cylinder 25 so that the hydraulic actuator 21 is assisted by the pneumatic actuator throughout the feed movement.

As the carriage 13 reaches the forward limit of its travel, the dog 82 actuates the switch S—4 to closed position thereby energizing solenoid SOL—2 which shifts the valve V—1 to reverse position. Compressed air is then directed by way of passage 37 to the forward end of the pneumatic cylinder 25 and the rear end of that cylinder is vented to the atmosphere.

Compressed air is also directed by way of passage 66 to the cylinder 65 in the valve unit to advance the actuator piston 64 and open the valve V—3. Valve V—3 establishes communication between opposite ends of the hydraulic cylinder 26 for the transfer of fluid therebetween while the carriage is being returned by the pneumatic actuator. During such return movement fluid from the rear end of the cylinder 26 is directed by way of the passage 53, valve V—3, passages 56, 57 and 67, check-valve V—4 and passage 54 to the forward end of the cylinder. The rate of flow and hence the speed imparted to the carriage is regulated by a restricting member 91 interposed in the passage 67 as shown in Fig. 7. It will be appreciated that the fluid discharged by the pump 22 joins the fluid from the rear end of the cylinder and passes with it through the valve V—3 to the forward end of the cylinder by way of the circuit above described. Excess fluid is returned to the reservoir by way of the drain 57 and passage 55.

When the carriage reaches its fully retracted position, the dog 80 opens the switch S—2 to condition the controls for the next machine cycle. Air pressure is maintained in the forward end of the pneumatic cylinder 25 and in the outer end of the cylinder 65 so that the actuator plunger 63 maintains the valve V—3 open whereby fluid delivered by the pump 22 is returned to the reservoir by way of the passage 56, drain 57 and passages 55 and 57'. The machine therefore remains at rest until the starting switch S—1 is reoperated.

It will be apparent from the foregoing that the invention provides a machine tool drive mechanism of novel and advantageous construction. The improved mechanism is particularly suitable for imparting approach, feed and return movement to a reciprocable machine element utilizing a simple, inexpensive pneumatic actuator for moving the machine element when the tool and work are not in operative association. A relatively small hydraulic system may be utilized for obtaining the feed movements. Thus, the advantages of hydraulic operation are obtained with less expensive valves, less piping, and a smaller hydraulic pump than are required in conventional hydraulic drives of comparable power and adaptability.

The invention also provides novel control means for regulating the operations of the pneumatic and hydraulic actuators to effect the automatic cycling of the machine. The controls are of a simple character and are adapted to be assembled in a single compact unit which can be mounted in closely coupled relation to the actuator so that external piping is reduced to a minimum.

I claim:

1. In a machine tool having a reciprocable carriage, the combination of a pneumatic actuator operatively connected with the carriage, a hydraulic actuator operatively connected with the carriage, a pump connected for delivering pressure fluid to one side of said hydraulic actuator, a valve operable to direct air under pressure to said pneumatic actuator to effect a forward movement of the carriage, means including a control valve operative to establish substantially unobstructed communication between opposite sides of said hydraulic actuator for the transfer of fluid therebetween while the carriage is advanced by said pneumatic actuator, said control valve being operative when closed to interrupt said unobstructed communication between the opposite sides of the hydraulic actuator, passages establishing restricted communication between opposite sides of the hydraulic actuator permitting continued forward movement of the carriage at a feeding rate upon closure of said control valve, means for reversing said first mentioned valve to initiate a return movement of the carriage by said pneumatic actuator, and means including a pneumatically operated valve for establishing substantially unobstructed communication between opposite sides of said hydraulic actuator for the transfer of fluid therebetween while the carriage is returned by said pneumatic actuator.

2. In a machine tool having a reciprocable carriage, the combination of a pneumatic actuator operatively connected with the carriage, a hydraulic actuator operatively connected with the carriage, a pump connected for delivering pressure fluid to one side of said hydraulic actuator, a valve operable to direct air under pressure to said pneumatic actuator to effect a forward movement of the carriage, means including a control valve operative to establish substantially unobstructed communication between opposite sides of said hydraulic actuator for the transfer of fluid therebetween while the carriage is advanced by said pneumatic actuator, a metering valve, said control valve being operative when closed to interrupt said unobstructed communication between the opposite sides of the hydraulic actuator and to direct the fluid discharged therefrom through said metering valve whereby forward movement of the carriage is continued by said hydraulic actuator at a controlled feeding rate, means for reversing said first mentioned valve to initiate return movement of the carriage by said pneumatic actuator, and means including a pneumatically actuated valve for establishing substantially unobstructed communication between opposite sides of said hydraulic actuator for the transfer of fluid therebetween while the carriage is being returned by said pneumatic actuator.

3. In a machine tool having a reciprocable carriage, the combination of a pneumatic actuator for imparting forward and return movements to the actuator, a hydraulic actuator having inlet and outlet ports, means operatively connecting said hydraulic actuator with the carriage, valve means operable to direct air under pressure to said pneumatic actuator to initiate the forward movement of the carriage, a pump connected to deliver pressure fluid to said hydraulic actuator for imparting forward movement to the carriage, valve controlled means operable to establish communication between said actuator ports for the transfer of fluid from one side thereof to the other to supplement the output of said pump and thereby permit movement of the carriage by said pneumatic actuator at a speed substantially faster than the speed imparted thereto by said hydraulic actuator alone, said valve controlled means being operative upon a predetermined advance of the carriage for interrupting communication between said ports whereby to discontinue the transfer of fluid between the actuator ports, the advance of said carriage continuing at a feeding speed the maximum rate of which is determined by the output of said pump, and other valve means operative upon a further predetermined advance of the carriage to reverse the supply of air under pressure to said pneumatic actuator and to reestablish communication between said actuator ports whereby to enable the pneumatic actuator to impart a rapid return movement to the carriage.

4. In a machine tool having a reciprocable carriage, the combination of a pneumatic actuator for imparting forward and return movements to the actuator, a hydraulic actuator having inlet and outlet ports, means operatively connecting said hydraulic actuator with the carriage, valve means operable to direct air under pressure to said pneumatic actuator to initiate the forward movement of the carriage, a pump connected to deliver pressure fluid to said hydraulic actuator for imparting forward movement to the carriage, valve controlled means operable to establish substantially unobstructed communication between said actuator ports for the transfer of fluid from one side thereof to the other to supplement the output of the pump and thereby permit movement of the carriage by said pneumatic actuator at a speed substantially faster than the speed imparted thereto by said hydraulic actuator alone, said valve controlled means being operative upon a predetermined advance of the carriage for interrupting communication between said ports whereby to discontinue the transfer of fluid between the actuator ports and thereby restrict the carriage to a feeding speed the maximum rate of which is determined by the output of said pump.

5. In a machine tool having a reciprocable carriage, the combination of a pneumatic actuator for imparting forward and return movements to the actuator, a hydraulic actuator having inlet and outlet ports, means operatively connecting said hydraulic actuator with the carriage, valve means operable to direct air under pressure to said pneumatic actuator to initiate the forward movement of the carriage, a pump connected to deliver pressure fluid to said hydraulic actuator for imparting forward movement to the carriage, valve controlled means operable to establish substantially unobstructed communication between said actuator ports for the transfer of fluid from one side thereof to the other to permit movement of the carriage by said pneumatic actuator at a speed substantially faster than the speed imparted thereto by said hydraulic actuator, and a metering valve, said valve controlled means being operative upon a predetermined advance of the carriage for interrupting the unobstructed communication between said ports and for diverting the fluid through said metering valve to effect forward movement of the carriage at a feeding rate.

6. The combination in a machine tool having a reciprocable carriage, a pneumatic actuator operable to impart forward and return movements to the carriage, a hydraulic actuator for imparting forward feeding movements to the carriage comprising a cylinder, a piston working in said cylinder, a rod connecting said piston with the carriage, a hydraulic circuit for said cylinder including passages connecting with opposite ends of the cylinder, a source of pressure fluid connected with one of said passages, a drain passage, means including a control valve for establishing substantially unobstructed communication between the other of said passages and said drain passage for the discharge of fluid from one end of the cylinder while the carriage is being moved by said pneumatic actuator, and a metering valve rendered effective to regulate the discharge of fluid from said one end of the cylinder while the carriage is being moved by the delivery of pressure fluid to the other end of the cylinder.

7. The combination in a machine tool having a reciprocable carriage, a pneumatic actuator operable to impart forward and return movements to the carriage, a hydraulic actuator for imparting forward feeding movements to the carriage comprising a cylinder, a piston working in said cylinder, a rod connecting said piston with the carriage, a hydraulic circuit for said cylinder including passages connecting with opposite ends of the cylinder, a source of pressure fluid connected with one of said passages, a drain passage connected with the other of said conduits through a metering valve, and means including a control valve adapted when opened to establish communication between opposite ends of the cylinder for the transfer of fluid therebetween while said carriage is being moved by said pneumatic actuator, said metering valve being operative when said control valve is closed to regulate the discharge of fluid from the cylinder through said one passage and thereby determine the rate of movement of the carriage by said hydraulic actuator.

8. The combination in a machine tool having a reciprocable carriage, of a pair of cylinders supported below said carriage in axial alinement, a piston rod extending through both of said cylinders and operatively connected with said carriage, said rod having pistons working in the respective cylinders, valve means for admitting air to either end of one of said cylinders selectively to impart forward and return movements to the carriage, a source of liquid under pressure, conduit means connecting said source to one end of the other cylinder, other conduit means connecting with the opposite end of said other cylinder, and valve means for establishing communication between said two conduit means to permit free circulation of liquid between the ends of said other cylinder during the forward and return movements of the carriage by said one cylinder and the piston working therein.

9. The combination in a machine tool having a reciprocable carriage, of a pair of cylinders supported below said carriage in axial alinement, a piston rod extending through both of said cylinders and operatively connected with said carriage, said rod having pistons working in the respective cylinders, valve means for admitting air to either end of one of said cylinders selectively to impart forward and return movements to the carriage, a source of liquid under pressure connected with one end of the other of said cylinders, and valve means controlling the discharge of liquid from the other end of said other cylinder to restrict the forward movement of the carriage to a feeding rate.

10. Drive mechanism for a reciprocatory machine tool carriage comprising, in combination, a pneumatic actuator operative to impart rapid approach and return movements to the carriage, a hydraulic actuator operative to impart relatively slow feeding movements to the carriage, valve means for initiating the operation of said pneumatic actuator to impart an approach movement to the carriage at the beginning of a machine cycle, and means including a control valve for initiating the operation of said hydraulic actuator upon a predetermined approach movement of the carriage, said first mentioned valve means being further operative to interrupt the operation of said hydraulic actuator and to initiate the operation of said pneumatic actuator for imparting a return movement to the carriage.

11. Drive mechanism for a reciprocatory machine tool carriage comprising, in combination, a pair of cylinder and piston actuators operatively connected with the carriage, valve means operable to admit air under pressure to either end of one of the actuator cylinders selectively to impart rapid approach and return movements to the carriage, means for supplying liquid under pressure to one end of the other actuator cylinder, passages for establishing communication between opposite ends of said other actuator cylinder to permit substantially unobstructed transfer of liquid therebetween when said one actuator is in operation, and other valve means for interrupting such unobstructed transfer of liquid and for diverting the same through a metering valve to effect movement of the carriage at a controlled feeding rate.

12. Drive mechanism for a reciprocatory machine tool carriage comprising, in combination, a pair of cylinder and piston actuators operatively connected with the carriage, valve means operable to admit air under pressure to either end of one of the actuator cylinders selectively to impart rapid approach and return movements to the carriage, a source of liquid under pressure connected with one end of the other actuator cylinder, and valve controlled means operative when said one actuator is in operation for establishing communication between opposite ends of said other actuator cylinder for the free circulation of fluid therebetween, said valve controlled means acting to interrupt communication between the cylinder ends to condition said other actuator for driving the carriage.

EARNEST Y. SEBORG.

REFERENCES CITED

The following references are of record in the file of this patent:

UNITED STATES PATENTS

| Number | Name | Date |
|---|---|---|
| 2,138,236 | Horton | Nov. 29, 1938 |
| 2,224,956 | Ernst | Dec. 17, 1940 |